United States Patent
Sitaraman et al.

(10) Patent No.: US 8,046,463 B1
(45) Date of Patent: Oct. 25, 2011

(54) METHOD AND APPARATUS FOR CONTROLLING DOUBLE-ENDED SOFT PERMANENT VIRTUAL CIRCUIT/PATH CONNECTIONS

(75) Inventors: Aravind Sitaraman, Karnataka (IN); Somashekar S. V. Murthy, Karnataka (IN); Uma Mahesh Mudigonda, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 2128 days.

(21) Appl. No.: 10/650,250

(22) Filed: Aug. 27, 2003

(51) Int. Cl.
*G06F 15/173* (2006.01)
(52) U.S. Cl. ......................................... 709/226
(58) Field of Classification Search .................. 709/226
See application file for complete search history.

(56) References Cited

U.S. PATENT DOCUMENTS

| | | | |
|---|---|---|---|
| 5,519,836 A | 5/1996 | Gawlick et al. | 395/200.15 |
| 5,754,532 A | 5/1998 | Dev et al. | 370/250 |
| 5,894,471 A | 4/1999 | Miyagi et al. | 370/230 |
| 6,115,372 A | 9/2000 | Dinha | 370/352 |
| 6,125,119 A | 9/2000 | Cherukuri et al. | 370/410 |
| 6,128,305 A | 10/2000 | Hjalmtysson et al. | |
| 6,195,714 B1 | 2/2001 | Li et al. | 710/31 |
| 6,243,387 B1 | 6/2001 | Hjalmtysson et al. | |
| 6,556,577 B2 | 4/2003 | Hjalmtysson et al. | |
| 6,597,689 B1 * | 7/2003 | Chiu et al. | 370/354 |
| 6,643,265 B1 | 11/2003 | Schzukin | |
| 6,665,295 B1 * | 12/2003 | Burns et al. | 370/389 |
| 6,744,733 B2 | 6/2004 | Kamo | 370/236.1 |
| 6,775,288 B1 * | 8/2004 | Tooker et al. | 370/395.2 |
| 6,822,962 B1 | 11/2004 | Noake et al. | 370/395.2 |
| 7,016,375 B1 | 3/2006 | Rosenberg et al. | |
| 7,162,520 B1 | 1/2007 | Mudigonda et al. | |
| 7,392,305 B2 | 6/2008 | Mudigonda et al. | |
| 2002/0054576 A1 | 5/2002 | Gobbi | 370/316 |
| 2003/0099192 A1 | 5/2003 | Scott et al. | 370/410 |
| 2003/0131028 A1 * | 7/2003 | Radi et al. | 707/204 |
| 2004/0022247 A1 | 2/2004 | Chen et al. | 370/395.5 |
| 2008/0175250 A1 * | 7/2008 | Chen et al. | 370/395.1 |
| 2009/0041022 A1 * | 2/2009 | Chase et al. | 370/395.1 |

OTHER PUBLICATIONS

USPTO Jun. 7, 2006 Notice of Allowance from U.S. Appl. No. 10/461,691.
USPTO Nov. 26, 2007 Nonfinal Office Action from U.S. Appl. No. 11/518,477.
USPTO Feb. 2, 2011 Notice of Allowance from U.S. Appl. No. 11/518,477.

* cited by examiner

*Primary Examiner* — John Follansbee
*Assistant Examiner* — Alan S Chou
(74) *Attorney, Agent, or Firm* — Patent Capital Group

(57) ABSTRACT

A method and apparatus control a double-ended soft permanent virtual circuit (SPVC) connection coupling from a source end to a destination end via a communications network. The method includes (a) receiving an SPVC connection message from a first network device for the source end, (b) accepting an SPVC connection in accordance with the SPVC connection message if a second network device receiving the SPVC connection has an association with the first network device, and (c) rejecting the SPVC connection if the second network device does not have an association with the first network device. The network device for the destination end includes a database memory adapted to store an access identifier of at least one predetermined source network device from which the network device is allowed to accept an SPVC connection.

12 Claims, 8 Drawing Sheets

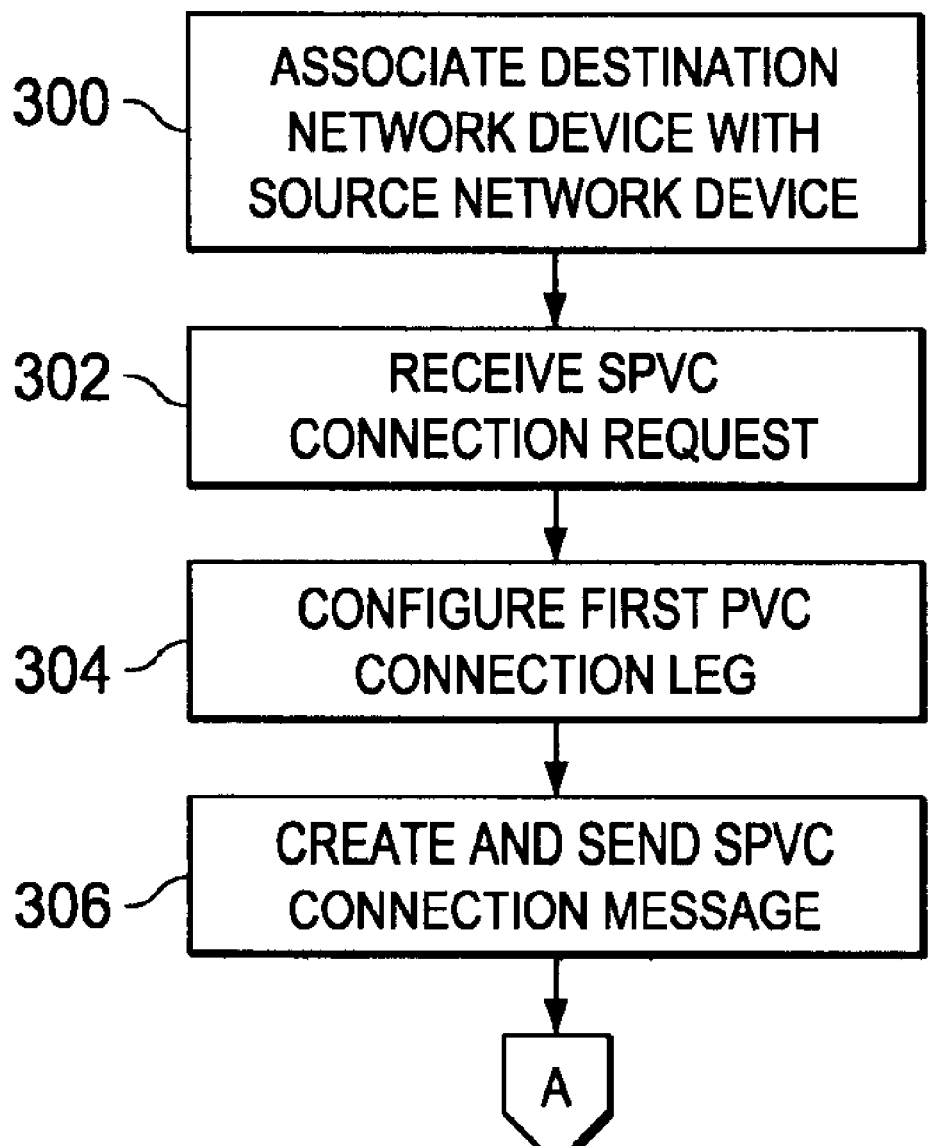

METHOD AND APPARATUS FOR CONTROLLING DOUBLE-ENDED SOFT PERMANENT VIRTUAL CIRCUIT/PATH CONNECTIONS

CROSS REFERENCE TO RELATED APPLICATION

This application is related to U.S. patent application Ser. No. 10/461,691, entitled "Method and Apparatus for Dynamic Connection Service Category Changes," filed on Jun. 13, 2003 assigned to the same assignee.

FIELD OF THE INVENTION

The present invention relates to computer internetworking and telecommunications. More particularly, the present invention relates to a method and apparatus for controlling double-ended Soft Permanent Virtual Circuit connections and double-ended Soft Permanent Virtual Path connections.

BACKGROUND OF THE INVENTION

Asynchronous Transfer Mode (ATM) connection services and Frame Relay (FR) connections are typically implemented using Permanent Virtual Circuit (PVC) connections and Switched Virtual Circuit (SVC) connections. For example, an PVC connection via an ATM network, the virtual channel identifier (VCI) and virtual path identifier (VPI) values are manually configured at each switching point in the connection, typically at each interface of network devices such as switches, routers, and switch-routers. In an ATM cell header, for example, the VCI and VPI are a 16-bit field and a 8-bit field, respectively. In PVCs, the VCI and the VPI are used to identify the next destination of a cell as it passes through a series of ATM switches on its way to its destination. ATM switches use the VPI/VCI fields to identify the next network virtual channel link (VCL) that a cell needs to transit on its way to its final destination. In a FR network, a data-link connection identifier (DLCI) is used in place or the VPI/VCI identifier. A value of the DLCI specifies a PVC or an SVC in a similar manner as the VPI and VCI. The manual configuration of VPI/VCI or DLCI values, though tedious, is required only once, because the PVC connection remains up permanently once the connection is set up. Thus, PVC connections are typically used for connections that are always or frequently in use or high-demand connections.

SVC connections are suitable for connections that are infrequently in use or short-lived connections. Using signaling, SVC connections are dynamically established on demand and are released when the connection is not being used. That is, end systems (typically source-end systems) request connectivity to other end systems (typically destination-end systems) on an as-needed basis, and if certain criteria for the connection are met, the connection is set up at the time of request. When the connection is no longer needed, for example, the transmission is completed or terminated, it is dynamically torn down, freeing network bandwidth. The same SVC connection can be brought up again when it is requested. In addition, if one link in an SVC connection fails, the SVC connection is automatically rerouted around the failure through the communications network.

The third type of connections are a hybrid of the PVCs and SVCs, referred to as Soft Permanent Virtual Circuit (Soft PVC or SPVC) connections. FIG. 1 schematically illustrates a typical SPVC 10 which includes PVC connections 12 and 13, and an SVC connection 14. For example, as shown in FIG. 1, the PVC connection 12 is set up from an edge router 16 to a network device 18, the SVC connection 14 is set up from the network device 18 to another network device 20 via a communications network 22, and the PVC connection 13 is set up from the network switch 20 to a destination device (typically an edge router) 24. In a typical mode of configuration, the edge routers 16 and 24 are "un-trusted" edge routers outside a secured or private network, and the SVC connection 14 is set up inside a "trusted" network such as a Service Provider network or a private corporation network.

Although an SPVC connection is a permanent connection, it allows end devices (for example, the routers 16 and 24 in FIG. 1) attached to the network devices to be interconnected via an SVC connection, which will be automatically rerouted around failures in the link through the communications network as mentioned above. For example, as shown in FIG. 1, an SVC is dynamically created, using link A or link B. If either link fails, the SVC is automatically reestablished using the other link. In addition, since SPVC connections are set up through signaling (other than explicitly configured PVC connection(s) at end systems), the need for extensive manual configuration is substantially reduced.

FIG. 2 schematically illustrates a Soft PVC 30 connecting user A 32 and user D 34 through the ATM communications network 36. Unlike hard PVCs, the interface and VPI/VCI identifiers are configured only for the endpoints of the connection. For example, a PVC connection leg 38 is configured on a network device (switch B) 40 with an interface (0/0/0) and VPI/VCI values (0, 200), and another PVC connection leg 42 is configured on a network device (switch C) 42 with an interface (3/0/0) and VPI/VCI values (0. 100). The VPI/VCI values for the intermediate switching points, for example, an SVC connection leg 46 for the network device 40, an SVC connection leg 48 on the network device 44, and all other links though the ATM communications network 36, are not required to be configured, since these are dynamically determined by signaling.

There are two modes of SPVC configurations: single-ended SPVC connection provisioning and double-ended SPVC connection provisioning. In the single-ended SPVC connection provisioning, SPVCs are configured at the source endpoint (for example, the PVC connection leg 38 on the network device 40) and do not require configuration of a passive or destination endpoint (for example, the PVC connection leg 42 on the network device 44). Single-ended SPVCs are easier to configure and the passive endpoint is automatically created by the source endpoint. However, there is no guarantee that a single-ended SPVC can get the bandwidth or connection identifiers at the passive endpoint (destination network device) as requested from the source endpoint.

In the double-ended SPVC provisioning, users are required to configure a passive endpoint (for example, the PVC connection leg 42 on the network device 44) of a Soft PVC connection. However, this allows resources on the terminating switch (destination network device) to be reserved for the incoming SPVC connection, and usage parameter control (UPC) options can also be configured for individual SPVCs for traffic policing. Furthermore, packet discard options for congestion control may also be configured.

Double-ended SPVCs are advantageous over single-ended SPVCs in the following situations.

In the case where SPVC and SVC services are running on the same interface, the destination end VPI/VCI values are not "stolen" by an incoming SVC connection during a re-routing of an exiting SPVC connection. In the single-ended SPVC configuration, as soon as the SPVC is de-routed, the endpoint is deleted and the VPI/VCI values are released. Thus, the VPI/VCI values can be assigned to any incoming SVC call before reestablishing the SPVC connection and completing the re-routing. This is the same for an SPVC connection that is not in currently connected state and thus the VPI/VCI values can be assigned to an incoming SVC call. Furthermore, during an attempt to modify the traffic parameters of an exiting SPVC connection, the same problem may happen in single-ended SPVCs.

In addition, in single-ended SPVCs, when a source network device makes a request (call) to an SPVC address on a destination network device, the destination (passive) network device would simply accept the call, and any source network device can make such a call. Thus, two (or more) SPVCs with the same destination address and the same VPI/VCI values could be configured from different source network devices, and this is especially problematic in a multi-vendor environment. In double-ended SPVCs, however, the source end and destination end must "match," i.e., the service category, Peak Cell Rate/Sustained Cell Rate (PCR/SCR), and other parameters must be configured the same on both ends, avoiding such conflicting connections.

However, matching the service category, PCR/SCR, and other parameters is not a perfect solution, since even in the double-ended SPVCs, there are cases where an SPVC connection from one endpoint is inadvertently mis-configured to reach a wrong destination, and the service category, PCR/SCR, and other parameters of the mis-configured connection can match, especially, when these parameters have default values. Such mis-routing traffic due to configuration errors may have significant consequences. Furthermore, in connection-oriented networks using ATM communications, bandwidth and specific connection identifiers may be reserved for premium subscribers, and such configuration errors and mis-routing may result in depriving the subscribers of their premium services by unauthorized use.

Accordingly it would be desirable to provide a method and apparatus for controlling double-ended SPVC connections that solve the above-mentioned problems.

BRIEF DESCRIPTION OF THE INVENTION

A method and apparatus control a double-ended soft permanent virtual circuit (SPVC) connection coupling from a source end to a destination end via a communications network. The method includes (a) receiving an SPVC connection message from a first network device for the source end, (b) accepting an SPVC connection in accordance with the SPVC connection message if a second network device receiving the SPVC connection has an association with the first network device, and (c) rejecting the SPVC connection if the second network device does not have an association with the first network device. The network device for the destination end includes a database memory adapted to store an access identifier of at least one predetermined source network device from which the network device is allowed to accept an SPVC connection.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 7A and 7B are process flow diagrams schematically illustrating a method for controlling a double-ended SPVC connection from a source end to a destination end via a communications network, in accordance with one embodiment of the present invention.

DETAILED DESCRIPTION

Figure 1:
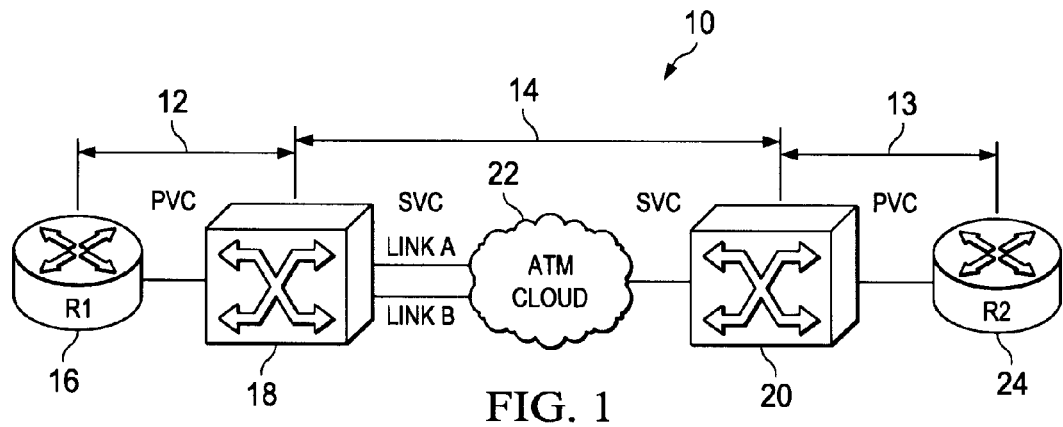
FIG. 1 is a diagram schematically illustrating a typical SPVC which includes PVC connections at both ends and an SVC connection via communications network.
Figure 2:
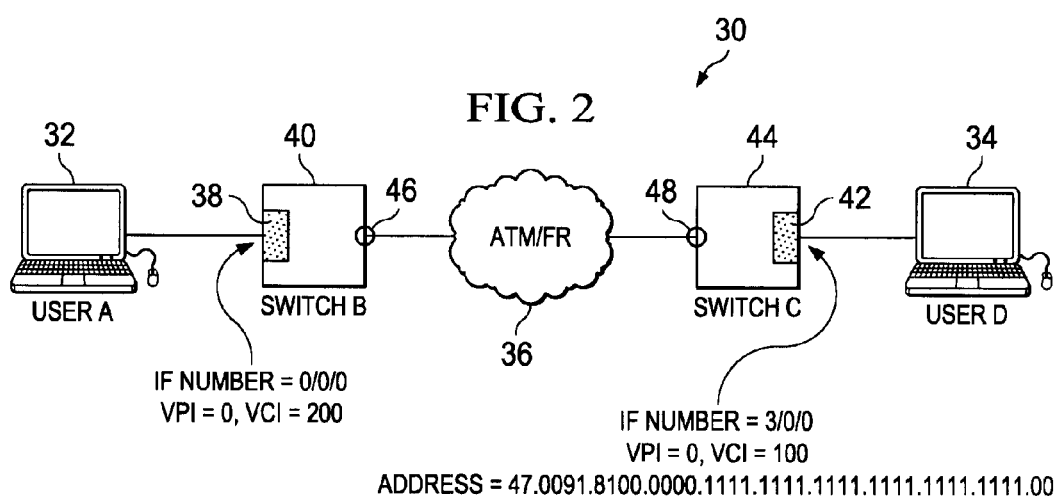
FIG. 2 is a diagram schematically illustrating a Soft PVC connecting user A and user D through an ATM communications network.

Embodiments of the present invention are described herein in the context of a method and apparatus for controlling double-ended soft virtual circuit connections and double-ended soft virtual path connections. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described here.

Figure 3:
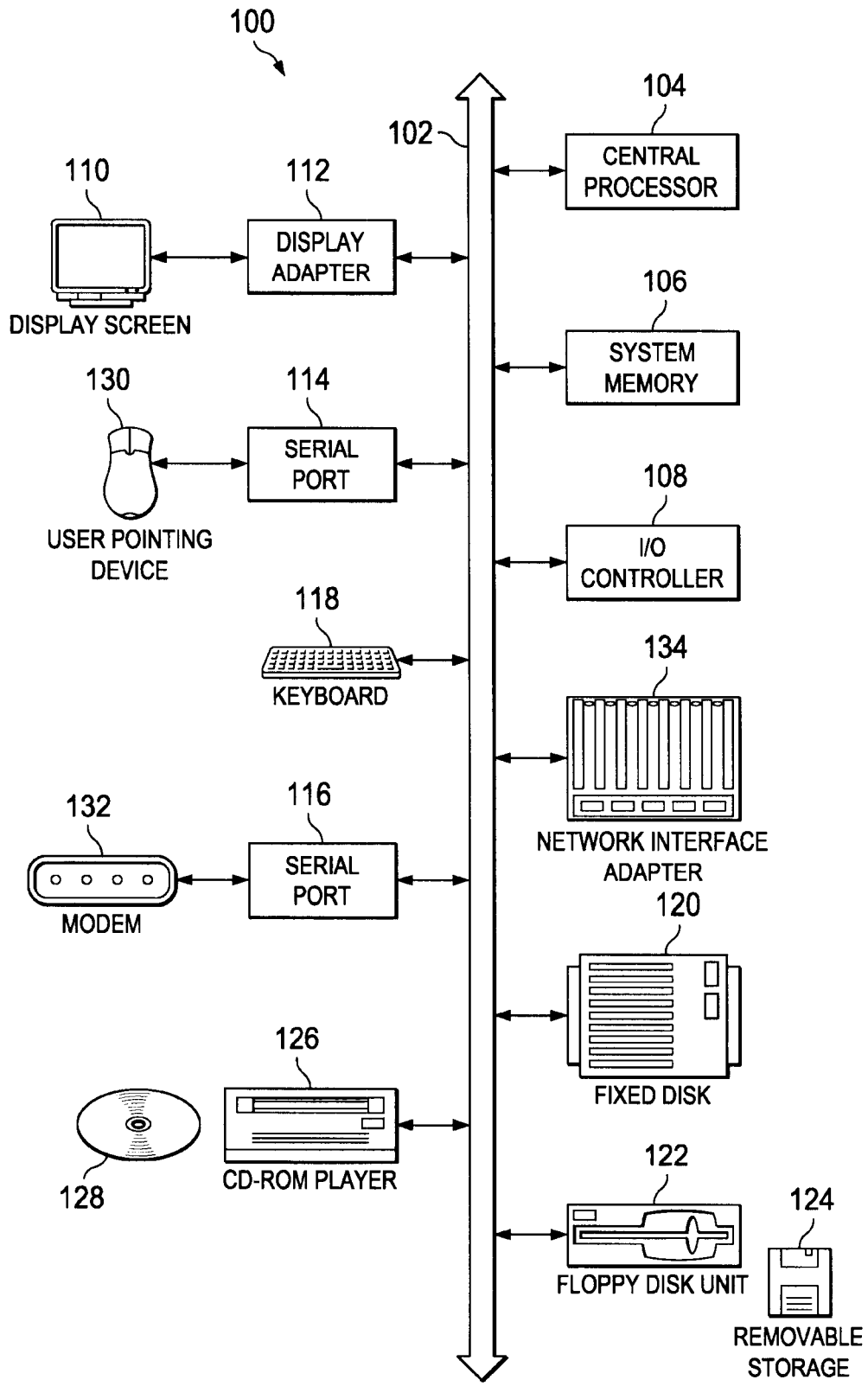
FIG. 3 is a block diagram schematically illustrating a computer system suitable for implementing aspects of the present invention.

FIG. 3 depicts a block diagram of a computer system 100 suitable for implementing aspects of the present invention. As shown in FIG. 3, computer system 100 includes a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 106 or stored on storage media such as fixed disk 120, floppy disk 124 or CD-ROM 128.

Figure 4:
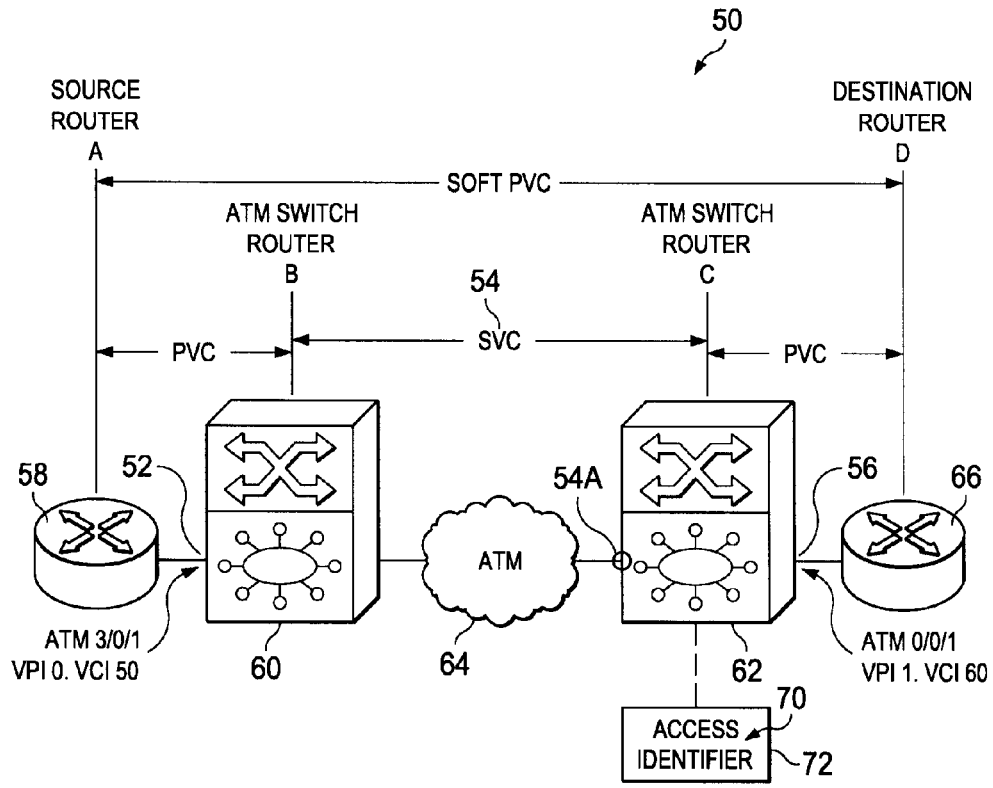
FIG. 4 is a diagram schematically illustrating an SPVC connection in accordance with one embodiment of present invention.

FIG. 4 schematically illustrates an SPVC connection 50 in accordance with one embodiment of present invention. As shown in FIG. 4, the SPVC connection 50 includes a first PVC connection leg 52, a SVC connection 54, and a second PVC connection leg 56. The PVC connection leg 52 may be set up from a source device 58, for example, an edge router, to a first network device 60. The SVC connection 54 may be set up from the first network device 60 to a second network device 62 via a communications network 64. The PVC connection leg 56 is set up from the second network device 62 to a destination device 66, for example, an edge router. The first and second network devices 60 and 62 may be network switches or switch routers. The communications network 64 may be an ATM network or a Frame Relay network.

Although the ATM network is used as an example in this description, the present invention is also applicable to double-ended SPVC connections set up via FR network. In addition, the SPVC connection 50 includes a soft permanent virtual path (SPVP) including a logical group of virtual circuits.

In this example of the SPVC connection 50, the PVC connection leg 52 is configured on an ATM interface (3/0/1) with VPI/VCI values (0, 50), and the passive PVC connection leg 56 is configured on an ATM interface (0/0/1) with VPI/VCI values (1, 60). As shown in FIG. 4, the second network device 62 is provided with an association 70 with at least one source network device (the first network device 60 in this example) from which the second network device 62 is allowed to accept an SPVC connection. The association 70 with the source network device may be provided by an access identifier of the source network device. For example, such an association 70 may be in a form of an access list 72 containing one or more access identifiers. The access identifier may be a network service access point (NSAP) address of the source network device, an alias for a closed user group (CUG) if such a group is defined, or the like.

Figure 5:
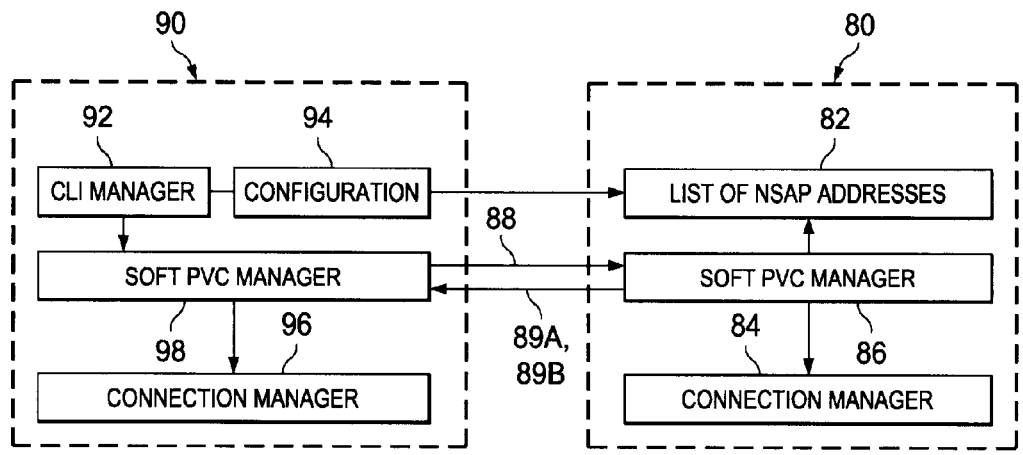
FIG. 5 is a block diagram schematically illustrating network devices for a destination (passive) end and a source end of an SPVC connection in accordance with one embodiment of the present invention.

FIG. 5 schematically illustrates a network device 80 for a destination (passive) end of an SPVC connection, and a network device 90 for a source end of the SPVC connection, in accordance with one embodiment of the present invention. For example, the network device 80 may be the second network device 62 in FIG. 4, and the network device 90 may be the first network device 60 in FIG. 4.

As shown in FIG. 5, the network device 80 includes a database memory 82, a connection manager 84, and an SPVC manager 86 coupled with the database memory 82 and the connection manager 84. The database memory 82 is adapted to store an access identifier of at least one predetermined source network device (for example, that of the network device 90) from which the network device 80 is allowed to accept an SPVC connection. For example, the database memory 82 stores an access list of NSAP addresses or CUG aliases as described above. The SPVC manager 86 receives an SPVC connection message 88 including an access identifier of the source network device 90, and determines if the access identifier of the source network device 90 matches the access identifier in the database memory 82. Controlled by the SPVC manager 86, the connection manager 84 allocates PVC connections and SVC connections on the network device 80.

Typically, when the SPVC manager 86 receives an SPVC connection message 88, it first determines if there is a matching PVC connection leg which has matching VPI/VPC values, service category, PCR/SCR, and other parameters specified by the SPVC connection message 88. Then, if there is a matching PVC connection leg, the SPVC manager 86 checks if an access list (association with the source network device(s)) is configured so as to determine whether to accept the SPVC connection.

If the access identifier of the source network device 90 matches the access identifier in the database memory 82, the SPVC manager 86 accepts the SPVC connection from the network device 90. As shown in FIG. 4, for example, the SPVC connection includes an incoming SVC connection leg 54$a$, which is dynamically created as described above. When the SPVC connection is accepted, the SPVC manager 86 cross-connects the incoming SVC connection leg 54$a$ with the PVC connection leg 56. Here, "cross-connect" means internally connecting a connection leg configured on a network device with another connection leg configured on the same network device. The SPVC manager 86 also associates the PVC connection leg 56 with the access identifier, and sends a Connect message 89$a$ to the network device 90. If the access identifier of the source network device 90 does not match the access identifier in the database memory 82, the SPVC manager 86 rejects the SPVC connection and, as shown in FIG. 5, sends a Release message 89$b$ to the network device 90, indicating the requested SPVC connection service or option is not available.

As shown in FIG. 5, the network device 90 includes an user interface module 92, a configuration module 94, a connection manager 96, and an SPVC manager 98 coupled with the user interface module 92 and the connection manager 96. The user interface module 92 is adapted to receive a request to create an SPVC connection and other commands such as configuration commands. The user interface module 92 may be a command line interface (CLI) manager or the like. The configuration module 94 is coupled to the user interface module 92, and used to configure the access list for a destination network device (such as the network device 80) so as to associate the destination network device with at least one predetermined source network device from which the destination network device is allowed to accept an SPVC connection. The configuration module is capable of configuring a destination network device in response to a command provided via the user interface module 92. It should be noted that the configuration module 94 (and corresponding user interface) may be separated from the network device 90, and may be provided, for example, in a network management console or the like which is capable of configuring network devices directly or indirectly.

The connection manager 96 is adapted to allocate PVC connections and SVC connections on the network device 90, under the control of the SPVC manager 98. The SPVC manager 98 generates an SPVC connection message 88 including the access identifier of the network device 90 in accordance with the command or request from the user interface module 92, and then transmits the SPVC connection message 88 to a destination network device (network device 80 in this example). The destination network device receives and processes the SPVC connection message as described above.

Figure 6:
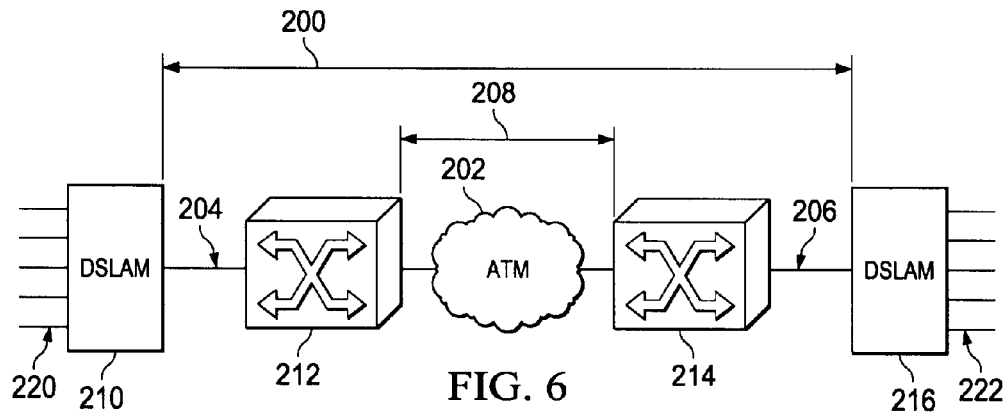
FIG. 6 is a diagram schematically illustrating an SPVC connection used to route Digital Subscriber Line (DSL) connections through an ATM communications network in accordance with one embodiment of the present invention.

FIG. 6 schematically illustrates an SPVC connection 200 used to route Digital Subscriber Line (DSL) connections through an ATM communications network 202 in accordance with one embodiment of the present invention. As shown in FIG. 6, the SPVC connection 200 includes PVC connection legs 204 and 206 and an SVC connection 208. The PVC connection leg 204 is set up from an end device 210, for example, a DSL access multiplexer (DSLAM) or concentrator, to a network device 212 such as an ATM switch. The SVC connection 208 is set up from the network device 212 to another network device 214. The PVC connection leg 206 is set up from the network device 214 to another end device (DSLAM) 216. The end devices 210 and 216 provide DSL connections 220 and 222, respectively, to customer premises equipment (CPE).

By configuring the passive side network device (for example, the network device 214) so as to associate it with a source network device (using an access identifier or an access list, for example) from which the passive side network device can accept an SPVC connection, this embodiment realizes a mechanism to allow only a particular source CPE to communicate with the destination passive endpoint.

Figure 7B:
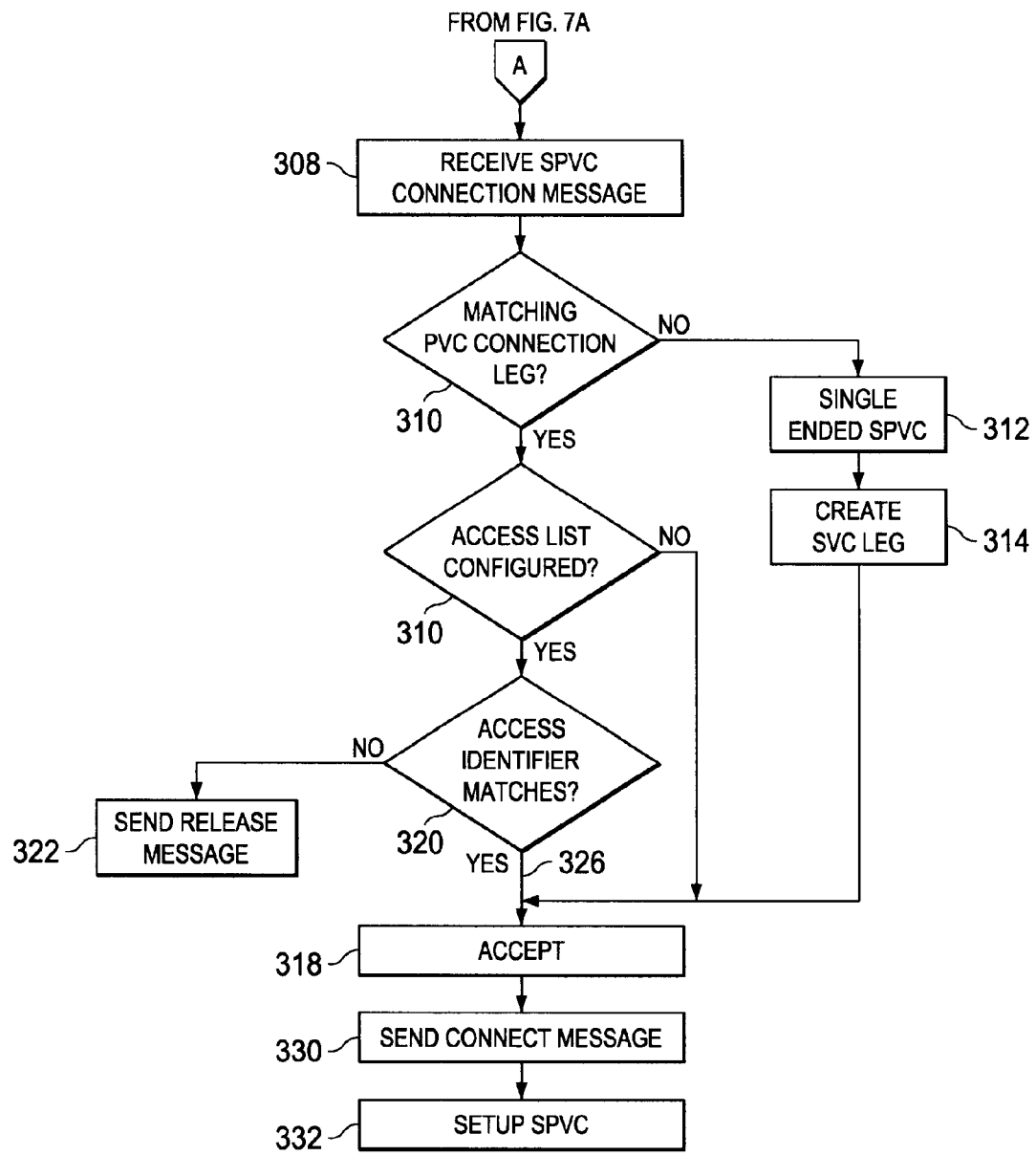

FIGS. 7A and 7B schematically illustrates a method for controlling a double-ended SPVC connection from a source end to a destination end via a communications network, in accordance with one embodiment of the present invention. For example, the double-ended SPVC may be the SPVC connection 50 (FIG. 4) or the SPVC connection 200 (FIG. 6). A first network device for the source endpoint (source network device) may be the network device 90 shown in FIG. 5, and a second network device for the destination or passive endpoint (destination network device) may be the network device 89 shown in FIG. 5.

First, the destination network device is associated with an access identifier of a source network device from which the destination network device is allowed to accept an SPVC connection (300). For example, an access list containing such access identifier(s) is created and associated with the destination network device. The access identifier may be an NSAP address (ATM NSAP address) or CUG alias, as described above. The destination network device may be configured with the access list using configuration commands. Also, if the destination network device already has an access list or is already associated with another source network device, a new access identifier can be added to the access list through this configuration process.

Typically, creation of a double-ended SPVC connection is initiated at the network device for the source end, where a request to create an SPVC connection is received (302), for example, via a user interface. In accordance with the request, a first PVC connection leg between the source network device and the source end is configured (304). For example, as shown in FIG. 5, the SPVC manager 98 may request the connection manger 96 to allocate the first PVC connection leg and corresponding resources. Then, an SPVC connection message including an SPVC setup request is generated and sent to the second network device for the destination end (306). The SPVC connection message also includes an access identifier of the source network device, and may further include connection service parameters and information such as connection traffic parameters, packet discard information, and usage parameter control information.

At the destination network device, the SPVC connection message is received (308). Typically, the destination network device determines if there is a matching PVC connection leg having matching VPI/VPC values, service category, PCR/SCR, and other parameters specified by the SPVC connection message (310). If such a matching PVC connection leg does not exist, this means that the incoming SPVC connection is a single-ended SPVC connection (312), and thus it is processed in accordance with a conventional manner as described above. That is, a new SVC connection leg is dynamically created (314), and the incoming SPVC connection is accepted (318).

If a matching PVC connection leg exists, this means that the incoming SPVC connection is a double-ended SPVC, and the destination network device checks if any access list or association with one or more source network device is configured for SPVC connections (316). In the case where no access list is configured, the SPVC connection is accepted (318). If an access list is configured, the second network device determines if the destination network device has an association with the source network device, i.e., determines whether an access identifier of the source network device (included in the SPVC connection message) matches the access identifier in the access list (320). If the access identifier does not match, the SPVC connection is rejected and the second network device may send a Release message to the first network device (322), indicating that the requested service or option is not available. If the access identifier of the source network device matches (326), the SPVC connection requested by the SPVC connection message is accepted (318).

When the SPVC connection is accepted (318), the destination network device cross-connects the incoming SVC connection leg with the second PVC connection leg, and associates the second PVC connection leg with the access identifier. The destination network device may transmit a Connect message to the source network device (330). After confirming that the destination network device has accepted the SPVC connection, the source network device cross-connects the dynamic SVC connection leg to the first PVC connection leg, and the entire double-ended SPVC connection is setup via the communications network (332).

The above-described method is also applied to SPVC connection messages other than an SPVC setup request to create a new SPVC connection. For example, the destination (passive) network device may receive an SPVC connection message including an SVC connection request to create a new SVC connection, an SVC release request to release an existing SVC connection, a connection category change request to change a connection service category for an existing SPVC connection, or the like. In either case, the destination network device checks not only matching VPI/VCI values, service category and other parameters for the corresponding SVC or PVC connection leg, but also an access list or any association (if configured) with a source network device, as described above. Thus, only authorized source network devices having a matching access identifier can create a new SVC connection, delete an existing SVC connection, or change a service category of an existing SPVC connection, and the like, preventing any mis-configuration or undesirable connection or deletion.

Figure 8A:
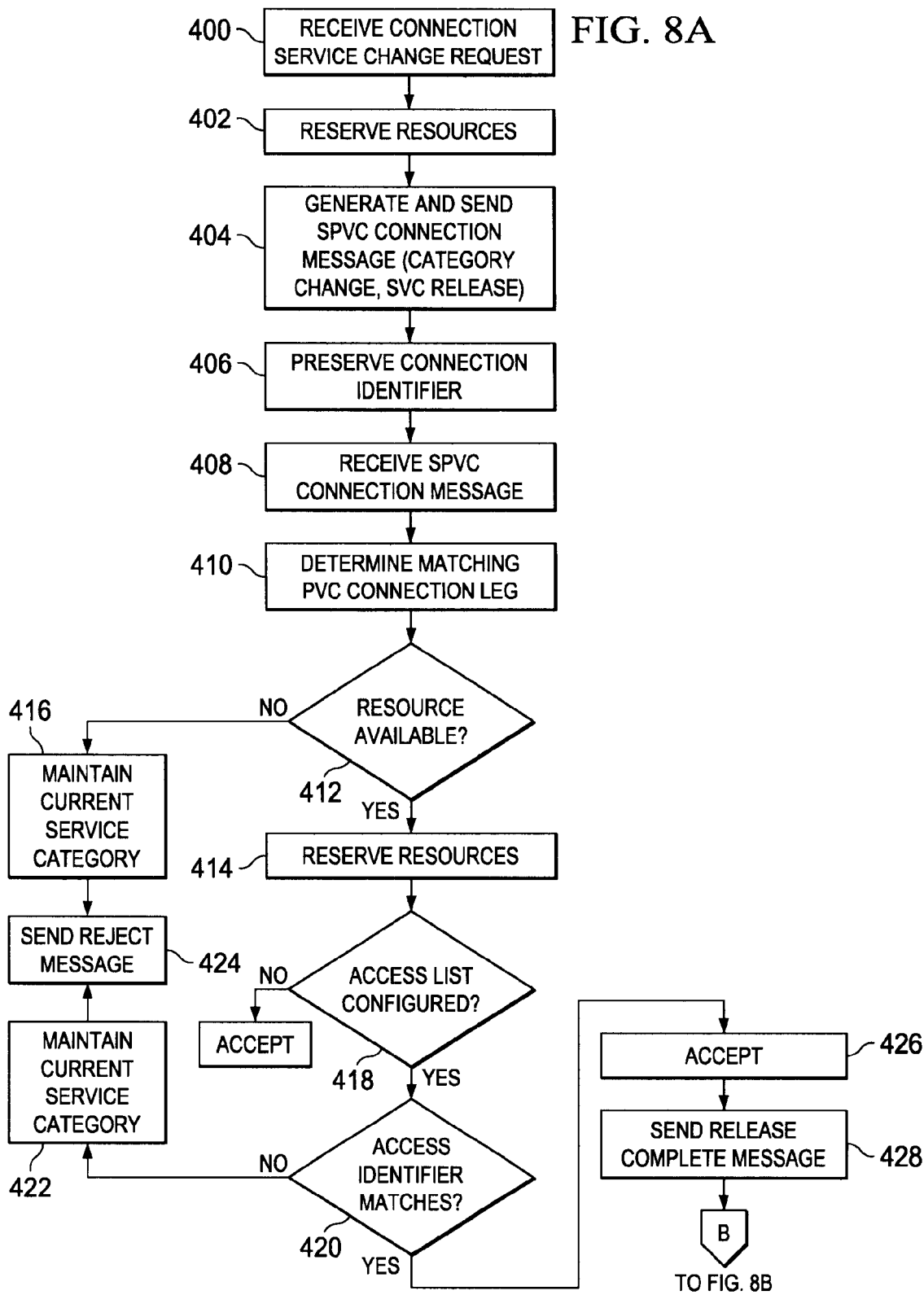
FIGS. 8A and 8B are process flow diagrams schematically illustrating a method for controlling a double-ended SPVC when a connection service category is changed for an existing SPVC connection in accordance with one embodiment of the present invention.
Figure 8B:
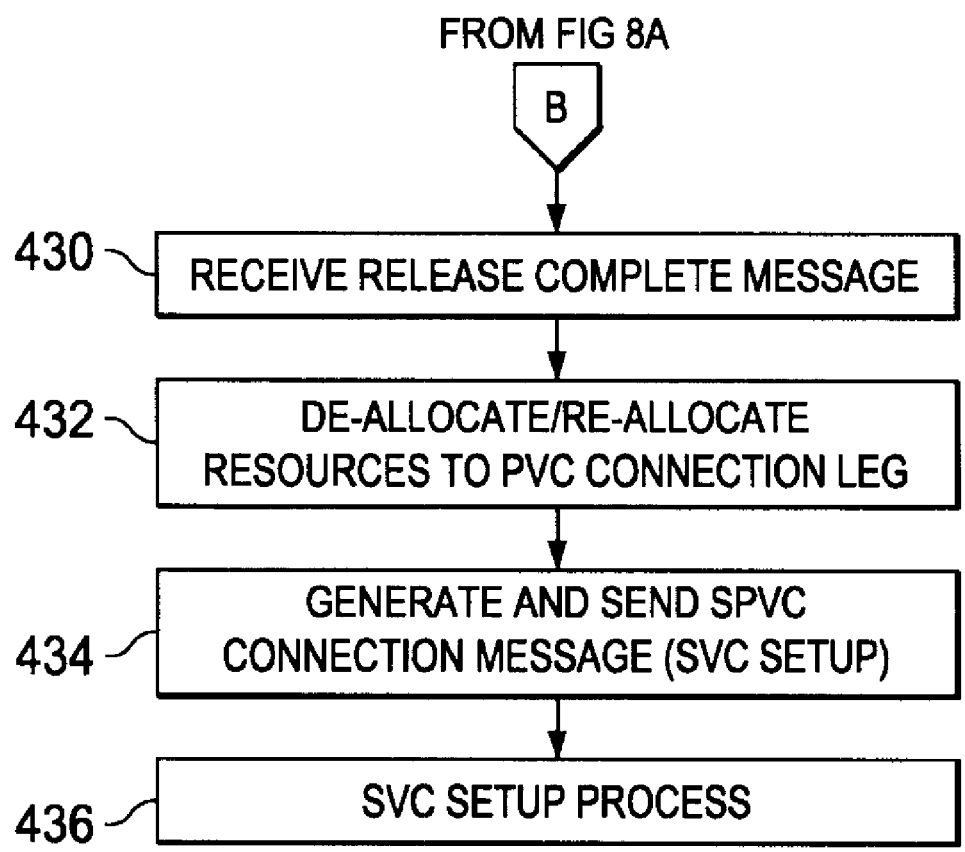

FIGS. 8A and 8B schematically illustrate a method for controlling double-ended SPVC connections when a connection service category is changed for an existing SPVC connection, in accordance with one embodiment of the present invention. At the source network device, a request to change a connection service category for an existing SPVC connection is received, for example, through a command line interface (400). The source network device reserves resources for a new connection service category (402), generates a SPVC connection message including an access identifier of the source network device, an SVC release request, and a connection service category change request for the existing SPVC connection (404), and send the SPVC connection message to the destination (passive) network device. The connection service category change request includes a new service category and corresponding parameter values. The source network device also preserves a connection identifier (VPI/VCI values) of the PVC connection leg at the source endpoint (406).

The destination network device receives the SPVC connection message (408), and determines the matching PVC connection leg having matching VPI/VPC values, service category, PCR/SCR, and other parameters specified by the SPVC connection message (410). The destination network device checks if resources are available to the new connection service category (and corresponding parameters) (412), and if so, reserves the resources for the new service connection category (414). If resources are not available for the new service category, the current service category is maintained (416) and the service category change request is rejected. The destination network device also checks if any access list or association with one or more source network device is configured (418). If so, the destination network device determines if it has an association with the source network device, i.e., determines whether an access identifier of the source network device (included in the SPVC connection message) matches the access identifier in the access list (420). If the access identifier does not match, the category change request is rejected and the current service category is maintained (422). In this case, and when resources are not available for the new service category, the destination network device may send a rejection message to the source network device (424), indicating that the requested service category change is not available. If the access identifier matches, the SPVC connection message is accepted (426), and the destination network device modifies the connection parameters and resources in accordance with the new connection service category, releases the SVC connection leg (i.e., release its cross-connection with the PVC connection leg), and transmits a Release Complete message to the source network device (428). During this process, the connection identifier of the destination side PVC connection leg is preserved.

Receiving the release complete message (430), the source network device de-allocates resources from the source-end PVC connection leg and allocates new resources on the source-end PVC connection leg (432). Then the source network device generates and sends an SPVC connection message including an SVC setup request to the destination network device (434). The destination network device receives the SPVC connection message and performs processes similar to that for an SPVC connection message with an SPVC setup request as described above (436). For example, if all of the connection identifier values, parameters, and the access identifier match, the requested SVC connection leg (which is part of the SPVC) for the new connection category is dynamically created. The SVC connection leg is cross-connected to the PVC connection leg at the both endpoints, thereby completing the connection category change of the SPVC connection.

Figure 9:
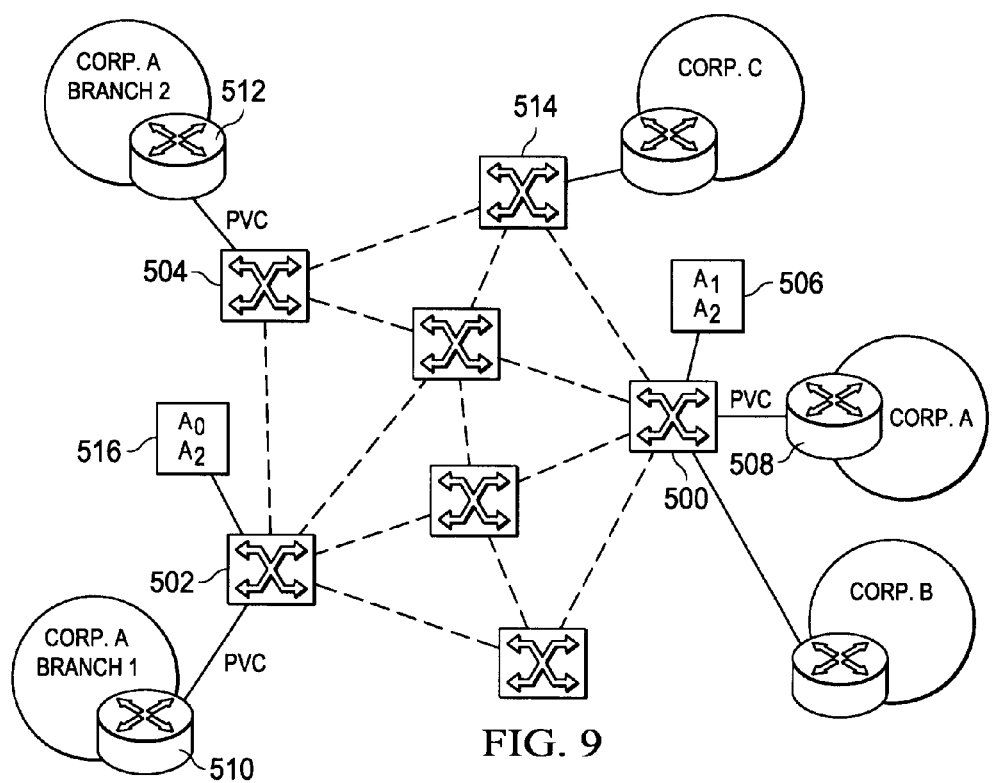
FIG. 9 is a diagram schematically illustrating an example of a network system utilizing double-ended SPVC connections in accordance with one embodiment of the present invention.

FIG. 9 schematically illustrates an example of a network system utilizing double-ended SPVC connections in accordance with one embodiment of the present invention. In this example, a destination network device 500 is associated with two source network devices 502 and 504, and thus configured with an access list 506 containing the access identifiers (A1, A2) of the source network devices 502 and 504. For example, the network device 500 is a switch or switch router for an edge router 508 of a private network of Corporation A, for example, and the network devices 502 and 504 are network switches for edge routers 510 and 512 of private networks of the first and second branch offices of Corporation A, respectively. Thus, when the destination network device 500 receives an incoming SPVC connection message to the edge router 508, it accepts the SPVC connection only if the messaged is from the network device 502 or 504. If an SPVC connection message comes from any network devices other than the network devices 502 and 504, for example, from a network device 514 for a private network of Corporation C, the destination network device 500 would reject the SPVC connection message even if all other identifiers and parameters match. Thus, this prevents mis-connection or mis-routing due to configuration error and the like.

It should be noted that a network device can be a source network device or a destination network device depending on which endpoint initiates the SPVC connection. For example, when a double-ended SPVC connection is set up from Corporation A to its first branch (i.e., the edge router 508 to the edge router 510), the network device 500 is a source network device and the network device 502 is a destination network device. In this case, as shown in FIG. 9, the network device 502 may be configured with an access list 516 containing the access identifiers of the network devices 500 and 504.

As described above, in accordance with one embodiment of the present invention, unauthorized access to a private or restricted ATM network from external users for a double-ended SPVC connection is prevented by controlling access to passive endpoint (destination network device) by associating the source endpoint (source network device) access identifier with the passive end point.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A network device for a destination end of a double-ended soft permanent virtual circuit (SPVC) connection, the SPVC connection coupling from a source end to the destination end via a communications network, said network device being configured to receive packets propagating in the communications network, the network device comprising:
   a database memory adapted to store an access identifier of at least one predetermined source network device from which the network device is allowed to accept an SPVC connection;
   a connection manager adapted to allocate a permanent virtual circuit (PVC) connection and a switched virtual circuit (SVC) connection on said network device; and
   an SPVC manager coupled with said database memory and said connection manager, said SPVC manager being adapted to control said connection manager and receive an SPVC connection message comprising an access identifier of a source network device, said SPVC manager being further adapted to determine if the access identifier of the source network device matches the access identifier in said database memory, wherein the SPVC connection message further comprises a service category parameter, a virtual path identifier (VPI) parameter, and a peak cell rate (PCR)/sustained cell rate (SCR) parameter, and wherein the access identifier comprises an alias for a closed user group (CUG), wherein a new connection service category change request for the existing SPVC connection triggers an evaluation of resources available to satisfy the new connection service category change request, and wherein if the resources are not available, the new connection service category change request is rejected and a current service category is maintained.

2. The network device in accordance with claim 1, wherein said SPVC manager is further adapted to:
   accept an SPVC connection if the access identifier of the source network device matches the access identifier in said database memory;
   cross-connect an incoming SVC connection leg with a PVC connection leg; and
   associate the PVC connection leg with the access identifier.

3. The network device in accordance with claim 2, wherein said SPVC manager is further adapted to determine if the access identifier of the source network device matches the access identifier in said database memory after finding a matching PVC connection leg in accordance with the SPVC connection message.

4. The network device in accordance with claim 3, wherein said SPVC manager is further adapted to reject the SPVC connection if the access identifier of the source network device does not match the access identifier in said database memory.

5. The network device in accordance with claim 1, wherein the access identifier comprises:
   a network service access point (NSAP) address of the source network device.

6. The network device in accordance with claim 1, wherein the communications network comprises:
   an Asynchronous Transfer Mode (ATM) network.

7. The network device in accordance with claim 1, wherein the communications network comprises:
   a Frame Relay (FR) network.

8. The network device in accordance with claim 1, wherein the source end comprises:
   an edge router.

9. The network device in accordance with claim 1, wherein the source end comprises:
   a digital subscriber line (DSL) access concentrator.

10. The network device in accordance with claim 1, wherein the destination end comprises:
    a destination network switch.

11. The network device in accordance with claim 1, wherein the destination end comprises:
    a destination edge router.

12. The network device in accordance with claim 1, wherein the destination end comprises:
    a digital subscriber line (DSL) access concentrator.

* * * * *